M. E. GYSEL.
SHAFT BEARING.
APPLICATION FILED DEC. 13, 1917.
1,400,055.  Patented Dec. 13, 1921.
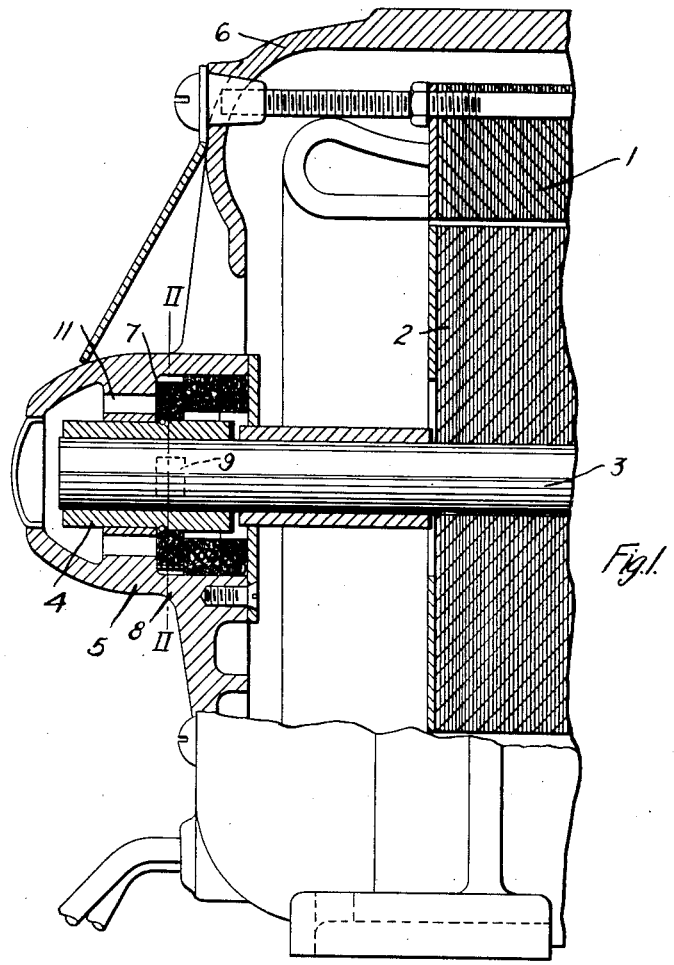
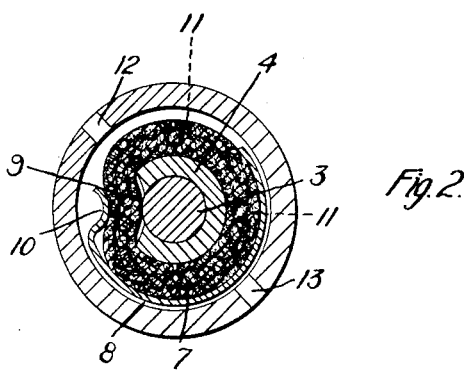
WITNESSES:
J. T. Wimmb
F. A. Lind.
INVENTOR
Max E. Gysel.
BY
Wesley G. Carr
ATTORNEY

UNITED STATES PATENT OFFICE.

MAX E. GYSEL, OF WILKINSBURG, PENNSYLVANIA, ASSIGNOR TO WESTINGHOUSE ELECTRIC AND MANUFACTURING COMPANY, A CORPORATION OF PENNSYLVANIA.

SHAFT-BEARING.

1,400,055.     Specification of Letters Patent.     Patented Dec. 13, 1921.

Application filed December 13, 1917. Serial No. 207,009.

*To all whom it may concern:*

Be it known that I, MAX E. GYSEL, a citizen of the Republic of Switzerland and a resident of Wilkinsburg, in the county of Allegheny and State of Pennsylvania, have invented a new and useful Improvement in Shaft-Bearings, of which the following is a specification.

My invention relates to shaft bearings and it has particular relation to means for lubricating such bearings.

The object of my invention is to provide a bearing for a shaft that shall be simple and inexpensive to manufacture and durable in service and which will allow the machine upon which it is mounted to be used for either wall, ceiling or floor mounting without changing the relative positions of the end bell and the stator.

Another object of my invention is to provide a bearing which will store as much lubricating fluid as is needed for efficient operation but which cannot be flooded by such lubricating fluid.

Heretofore, it has been customary to lubricate bearings of this character by means of oil cups, which serve their purpose very well so long as they remain in a vertical position but which necessitates changing the position of the end bell with respect to the field frame in order to place the oil cup in a vertical position when it is desired to change a machine adapted for one type of mounting to any other type of mounting.

By my invention, I have provided a bearing which is automatically fed with lubricating fluid and which stores as much of said lubricating fluid as is necessary for efficient operation but which cannot be flooded.

Figure 1 is a longitudinal sectional view of a portion of a dynamo-electric machine equipped with a bearing constructed in accordance with my invention; and Fig. 2 is a transverse sectional view of the bearing shown in Fig. 1, taken along the line II—II thereof.

Referring more particularly to the drawing, I have shown a portion of a dynamo-electric machine 1 provided with an armature 2 mounted upon a shaft 3 which is adapted to rotate in a bearing sleeve 4 that is supported in a bearing housing 5 constituting a part of the end bell 6 of the dynamo-electric machine 1. The bearing sleeve 4 is lubricated by means of annular members 7 and 8 composed of fibrous material which serve to carry the lubricating fluid to the shaft 3 through an opening 9 in the bearing sleeve 4. A spring member 10 serves to hold a portion of the annular member 7 in engagement with the shaft 3.

My bearing housing is so constructed that the lubricating fluid, which is carried by the annular member 7, is carried through the opening 9 and deposited on the shaft 3 and travels along the shaft to the end thereof, where it drops into the bearing housing 5 and flows through passages 11 to the fibrous washers 7 and 8. The passages 11 are located 90° apart, so that one of the openings will be at the lowermost part of the bearing when mounted in any position. The lubricating fluid is introduced to the washers 7 and 8 by means of diametrically opposite openings 12 and 13 which are disposed on a transverse axis extending substantially 45° from the horizontal. When an excess of lubricating fluid is introduced to the washers 7 and 8, the opening 13 provides an escape therefor, thereby preventing flooding of the bearing.

From the foregoing description of the drawing, it will be apparent to those skilled in the art that a machine equipped with a bearing constructed in accordance with my invention may be used for either floor, ceiling or wall mounting, since these positions are separated from one another by an annular displacement of 90° which insures that the transverse axis upon which the openings 12 and 13 are mounted will always be on an angle of 45° from the vertical, thereby insuring proper protection from flooding of the bearing. It will also be obvious that a device of this character cannot readily become displaced, since the spring member 10 holds the fibrous annular member in close engagement with the shaft at all times.

While I have shown one form of my invention and described in detail one application of the same, it will be obvious to those skilled in the art that it is not so limited but is susceptible of various minor changes and modifications without departing from the spirit thereof, and I desire, therefore, that only such limitations shall be placed thereupon as are imposed by the prior art or are specifically set forth in the appended claims.

I claim as my invention:

1. The combination with a shaft, a lubricant reservoir, a bearing sleeve surrounding said shaft and provided with an opening in the curved surface thereof, of an annular member composed of fibrous material surrounding said bearing sleeve and means whereby said fibrous material is positively held in contact with said shaft through the opening in said bearing sleeve, the lowermost portion of said fibrous member being disposed within said reservoir.

2. The combination with a shaft, a bearing sleeve provided with an opening therein, a bearing housing surrounding said sleeve and comprising a lubricant reservoir, and an annular member composed of fibrous material surrounding said sleeve and having a portion thereof disposed within said reservoir, of additional annular fibrous members in engagement with said first mentioned fibrous member and having portions thereof disposed within said reservoir.

3. The combination with a shaft, of a bearing housing comprising an oil reservoir and provided with openings communicating with said reservoir and so disposed diametrically opposite on a transverse axis as to maintain the oil in said reservoir at a constant level when said machine is moved angularly with respect to the axis thereof.

4. The combination with a shaft, of a bearing housing comprising an oil reservoir and provided with openings communicating with said reservoir and disposed diametrically opposite on a transverse axis substantially 45° from the horizontal.

5. The combination with a shaft, a bearing sleeve, and a bearing housing surrounding said shaft and supporting said bearing sleeve which is provided with an opening in the curved surface thereof, of an annular member composed of fibrous material surrounding said bearing sleeve but inclosed in said bearing housing, and a spring member adapted to hold said fibrous material in contact with said shaft through the opening in said bearing sleeve, for purposes of lubrication, said bearing housing embodying a reservoir for the lubricating agent and being provided with openings disposed diametrically opposite on a transverse axis substantially 45° from the horizontal.

6. The combination with a shaft, a bearing sleeve provided with an opening adjacent the central portion thereof, a bearing housing surrounding said sleeve and comprising an oil reservoir, an annular fibrous member surrounding said sleeve for introducing oil to said shaft through said opening in the sleeve and an auxiliary chamber adjacent to the end of said sleeve communicating with said reservoir for collecting and returning to the reservoir the oil leaving said shaft at the ends of said sleeve.

In testimony whereof, I have hereunto subscribed my name this 30th day of Nov. 1917.

MAX E. GYSEL.